United States Patent [19]
Sohn

[11] Patent Number: 6,033,094
[45] Date of Patent: Mar. 7, 2000

[54] MICROLENS ARRAY FOR IMPROVED ILLUMINATION PATTERNS

[75] Inventor: Alexander Sohn, Fuquay-Varina, N.C.

[73] Assignee: Fresnel Technologies, Inc., Fort Worth, Tex.

[21] Appl. No.: 08/942,956

[22] Filed: Oct. 2, 1997

[51] Int. Cl.⁷ .................................................. F21V 5/00
[52] U.S. Cl. ........................ 362/332; 362/330; 362/326
[58] Field of Search ................................... 362/326, 330, 362/332, 335

[56] References Cited

U.S. PATENT DOCUMENTS

| | | | |
|---|---|---|---|
| 3,163,367 | 12/1964 | Bodian | 362/330 |
| 3,330,951 | 7/1967 | Neal . | |
| 3,716,710 | 2/1973 | Clostermann et al. | 240/106 R |
| 3,735,124 | 5/1973 | Stahlhut | 240/106 R |
| 3,764,800 | 10/1973 | Clostermann | 362/330 |
| 3,794,829 | 2/1974 | Taltavull | 362/330 |
| 3,829,680 | 8/1974 | Jones | 362/330 |
| 4,080,529 | 3/1978 | Nagel . | |
| 4,172,273 | 10/1979 | Schilling et al. . | |
| 4,450,509 | 5/1984 | Henry . | |
| 5,003,448 | 3/1991 | Harvath . | |
| 5,603,561 | 2/1997 | Ohishi . | |

*Primary Examiner*—Laura K. Tso
*Attorney, Agent, or Firm*—Felsman Bradley Vaden Gunter & Vaden, LLP; James E. Bradley

[57] ABSTRACT

A microlens array is formed with lenses having many different symmetries to produce a large number of light output pattern shapes. The portions of the microlens array lenslets that direct light into undesirable locations are replaced with additional lenslets that redirect the light to where it is wanted. The microlens array has a plurality of primary lenslets on a substrate, the primary lenslets being curved shapes. Each of the primary lenslets has a surface area and a peripheral region. A plurality of secondary lenslets are at the peripheral regions of the primary lenslets and have surface areas which are smaller than the surface areas of the primary lenslets. The primary lenslets have a first vertical dimension and the secondary lenslets have a second vertical dimension which is smaller than the first vertical dimension. Tertiary lenslets may also be included in the microlens array. In the second of two described embodiments, the secondary and tertiary lenslets present convex cross-sectional shapes.

8 Claims, 3 Drawing Sheets

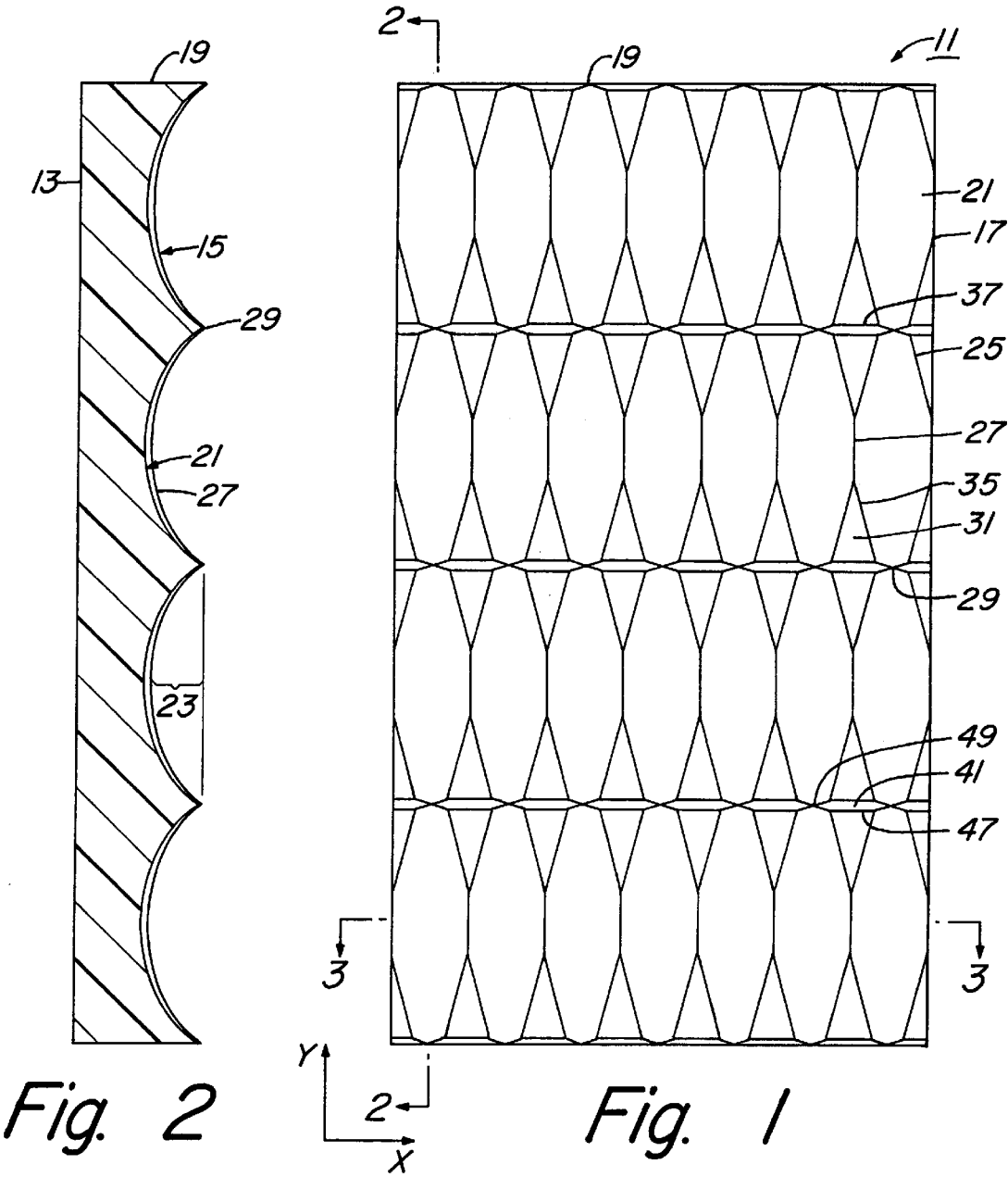
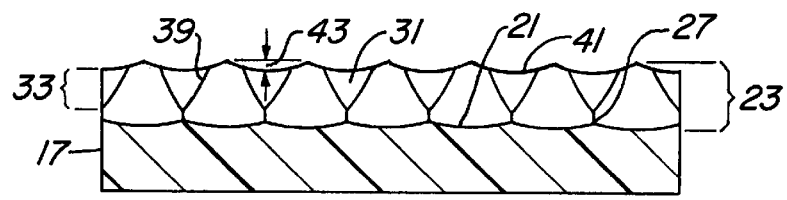
Fig. 2  Fig. 1  Fig. 3

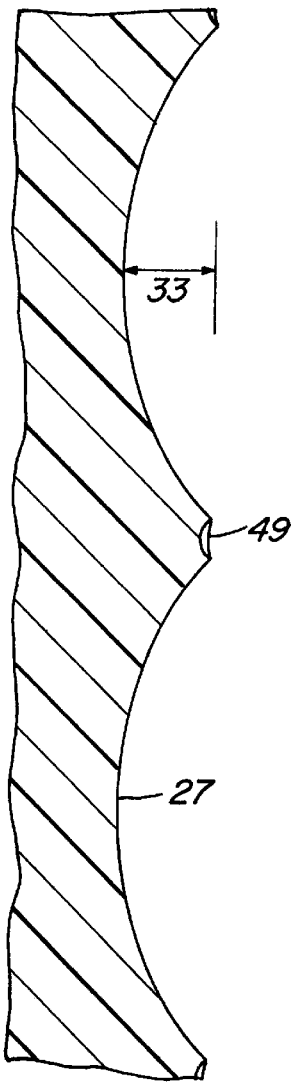
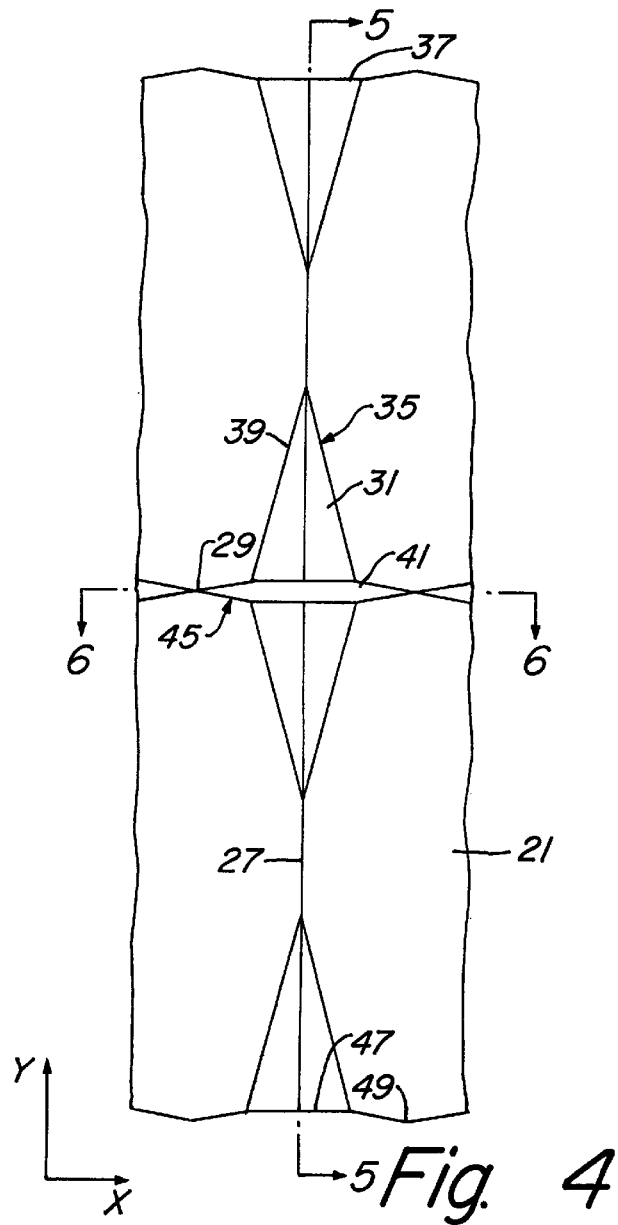
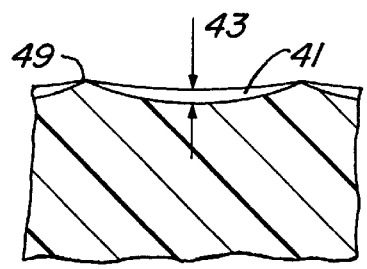
Fig. 5
Fig. 4
Fig. 6

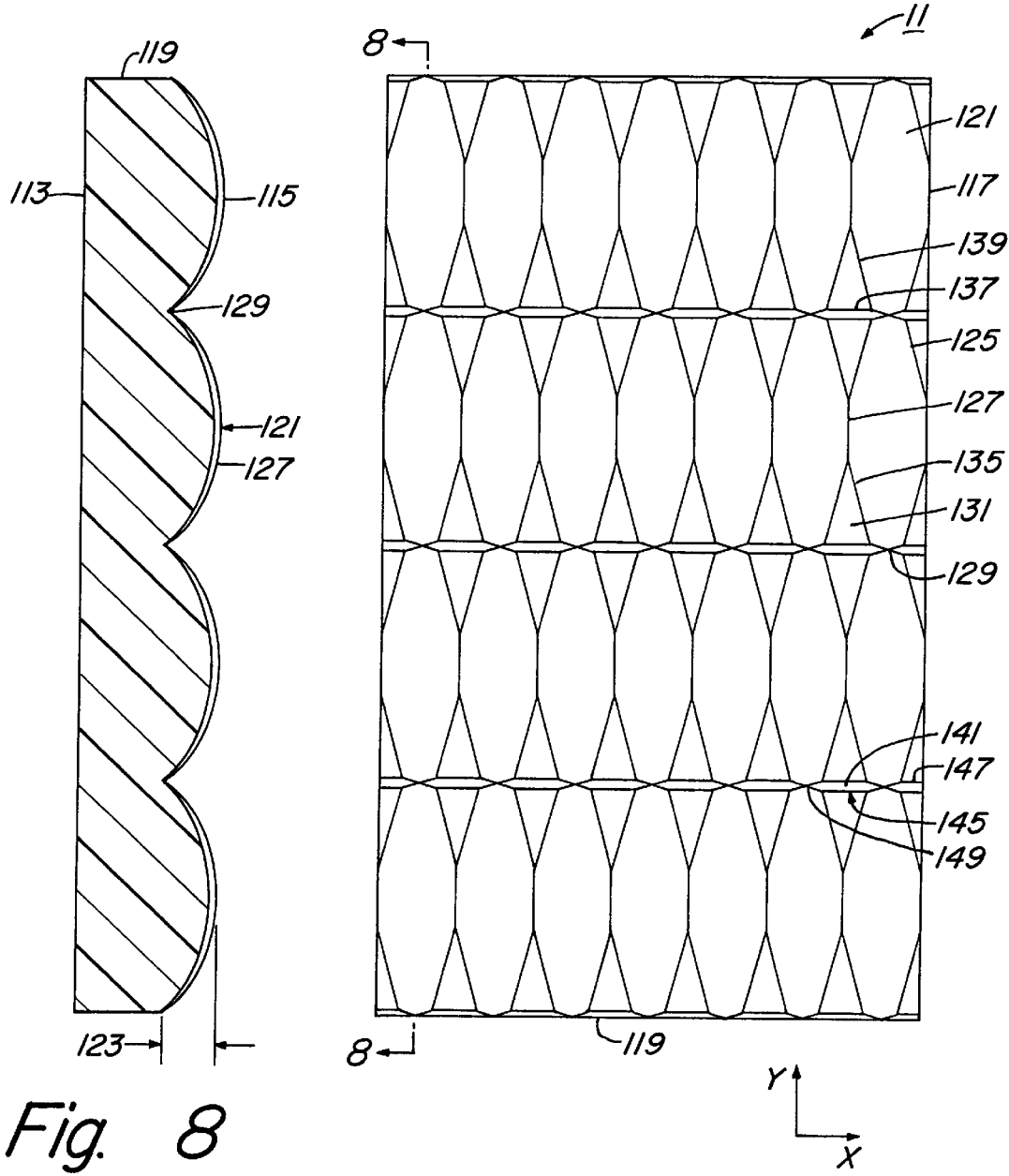

1

MICROLENS ARRAY FOR IMPROVED ILLUMINATION PATTERNS

TECHNICAL FIELD

This invention relates in general to illuminators and in particular to an improved microlens array for illumination.

BACKGROUND ART

Illuminators project an output pattern from a light source onto an illumination area. The key to making an effective illuminator is to direct as much of the light from the light source to the illumination area as possible while minimizing the amount of light directed or scattered elsewhere. There are many ways of directing light including reflectors, spherical lenses, aspheric lenses, Fresnel lenses, diffractive optics and lens arrays.

A microlens array is an array of small spherical or aspheric lenslets. Each lenslet in a microlens array produces its own output pattern according to its aperture dimensions, surface curvature, and the divergence of the incoming light from the source. If the output patterns of all the lenslets are summed, the total output pattern of the illuminator is obtained. If, for example, every lenslet in a microlens array has the same output pattern, the total output pattern has an intensity profile similar to that of the individual lenslet. Although this type of microlens array is excellent for disposing of most structure inherent in the light source, it is difficult or impossible to tailor the shapes of the output patterns.

Prior art microlens arrays have only two types of space-filling regular symmetries: four-fold and six-fold. At all but the smallest of aperture sizes compared to the focal lengths of the lenslets, four-fold or rectangularly symmetric, spherical microlens arrays, have an undesirable "dogbone-shaped" output pattern. Six-fold or hexagonally symmetric microlens arrays are usually limited to hexagonal or circularly-shaped output patterns. A more flexible means of tailoring the output pattern of an illuminator to fit the intended use is needed. Microlens arrays which produce even illumination with asymmetric or irregularly-shaped output patterns would be particularly useful.

DISCLOSURE OF INVENTION

A virtually unlimited number of output pattern shapes is possible if a microlens array is made with lenses having many different symmetries. The portions of the microlens array lenslets that direct light into undesirable locations are replaced with additional lenslets that redirect the light to where it is wanted. The sum of the output patterns of these additional lenslets may be tailored to almost any shape and is limited only by the shape of the individual lenslets and the maximum number of additional lenslets desired.

BRIEF DESCRIPTION OF DRAWINGS

FIG. 1 is a top view of a microlens array constructed in accordance with the invention.

FIG. 2 is a cross-sectional view of the microlens array of FIG. 1 taken along the line 2—2 of FIG. 1.

FIG. 3 is a cross-sectional view of the microlens array of FIG. 1 taken along the line 3—3 of FIG. 1.

FIG. 4 is an enlarged top view of a portion of the microlens array of FIG. 1.

FIG. 5 is a cross-sectional view of the microlens array of FIG. 4 taken along the line 5—5 of FIG. 4.

FIG. 6 is a cross-sectional view of the lens array of FIG. 4 taken along the line 6—6 of FIG. 4.

FIG. 7 is a top view of a second embodiment of a microlens array.

FIG. 8 is a cross-sectional view of the microlens array of FIG. 7 taken along the line 8—8 of FIG. 7.

BEST MODE FOR CARRYING OUT THE INVENTION

Referring to FIGS. 1 and 2, a small portion of an improved microlens array 11 for a particular light pattern is shown. Microlens array 11 has a substrate with appropriate optical properties and with a surface 13 on one side and a lens surface 15 on the opposite side. Surface 13 may be smooth but is preferably patterned. For reference herein, edges 17 are considered to be in a Y-direction and edges 19 are considered to be in an X-direction perpendicular to the Y-direction. The periphery of microlens array 11 may be of various shapes and need not be rectangular. Edges 17, 19 are shown for reference only.

Lens surface 15 has a plurality of primary lenslets 21 which are arranged into a symmetrical array of Y-direction columns extending from one edge 19 to the other edge 19 and X-direction rows extending from one edge 17 to the other edge 17. Referring to FIGS. 2 and 3, primary lenslets 21 are formed in lens surface 15 at a first vertical extent or depth 23 in the substrate. They are shown in the drawing as being generally spherical or aspheric concave or negative lenses. In cross-section, as shown in FIGS. 2 and 3, primary lenslets 21 curve in both the X-direction and Y-direction. The depth and positions of the lenslets are calculated mathematically and graphically.

Referring back to FIG. 1, each primary lenslet 21 has in projection a generally polygonal border or peripheral region 25. Primary lenslets 21 may have as few as four sides if secondary and tertiary lenslets are not present. In the preferred embodiment, peripheral region 25 is decagonal or ten-sided in shape and has a pair of Y-direction sides 27 and a pair of X-direction ends 29. Aside from the primary lenslets 21 located along Y-direction edges 17, each Y-direction side 27 adjoins a side 27 of an adjacent primary lenslet 21 in the same row. Similarly, other than the primary lenslets 21 located along X-direction edges 19, each X-direction end 29 adjoins an end 29 of an adjacent primary lenslet 21 in the same column.

Lens surface 15 also has a plurality of secondary lenslets 31 which form part of the border region 25 of the primary lenslets 21. Like primary lenslets 21, secondary lenslets 31 are formed in lens surface 15, but at a second depth 33 in the substrate (FIGS. 3 and 5). First depth 23 is deeper than second depth 33. Also, each secondary lenslet 31 has a lesser surface area than each primary lenslet 21. Secondary lenslets 31 are generally negative spherical or aspheric lenses. In the cross-sectional views of FIGS. 5 and 6, secondary lenslets 31 curve in both the X-direction and Y-direction. Referring to FIGS. 1 and 4, each secondary lenslet 31 has a polygonal border or peripheral region 35. In the preferred embodiment, periphery 35 is generally in the shape of an isosceles triangle with a base 37 and sides 39. Other than the secondary lenslets 31 located along X-direction edges 19, each base 37 is near a base 37 of an adjacent secondary lenslet 31. Each pair of adjacent secondary lenslets 31 extends partially between adjoining columns and rows of primary lenslets 21 so that peripheries 35 coincide with peripheries 25 along sides 39 (FIGS. 1 and 3).

Microlens array 11 further comprises a symmetrical array of tertiary lenslets 41 which are selectively formed between primary lenslets 21 and secondary lenslets 31 into X-direction rows. Tertiary lenslets 41 are optional and could be located at various positions. Tertiary lenslets 41 share a periphery 25 with primary lenslets 21 as well as with secondary lenslets 31. Each tertiary lenslet 41 extends into lens surface 15 for a third depth 43 (FIGS. 3 and 6). Second depth 33 is deeper than third depth 43. Also, each tertiary lenslet 41 has a lesser surface area than each secondary lenslet 31. Tertiary lenslets 41 have peripheries 45 which are hexagonal or six-sided in shape. Peripheries 45 have X-direction sides 47 and ends 49. Other than the tertiary lenslets 41 on edges 19, each side 47 coincides with a base 37 of a secondary lenslet 31. Each end 49 abuts another end 49.

Referring to FIGS. 7 and 8, a second embodiment microlens array 111 is shown. Like microlens array 11, microlens array 111 has a substrate with appropriate optical properties and a surface 113 on one side and a lens surface 115 on the opposite side. Surface 113 may be smooth but is preferably patterned. For reference herein, edges 117 are considered to be in a Y-direction and edges 119 are considered to be in an X-direction perpendicular to the Y-direction. The periphery of microlens array 111 may be of various shapes and need not be rectangular. Edges 117, 119 are shown for reference only.

Lens surface 115 has a plurality of primary lenslets 121 which are arranged into a symmetrical array of Y-direction columns extending from one edge 119 to the other edge 119 and X-direction rows extending from one edge 117 to the other edge 117. Primary lenslets 121 are formed in lens surface 115 at a first vertical dimension or elevation 123 in the substrate. They are shown in the drawing as being generally spherical or aspheric convex, or positive lenses. In cross-section, primary lenslets 121 curve in both the X-direction and Y-direction. The elevation and positions of the lenslets are calculated mathematically and graphically.

Each primary lenslet 121 has in projection a generally polygonal border or peripheral region 125. Primary lenslets 121 may have as few as four sides if secondary and tertiary lenslets are not present. In the preferred embodiment, peripheral region 125 is decagonal or ten-sided in shape and has a pair of Y-direction sides 127 and a pair of X-direction ends 129. Aside from the primary lenslets 121 located along Y-direction edges 117, each Y-direction side 127 adjoins a side 127 of an adjacent primary lenslet 121 in the same row. Similarly, other than the primary lenslets 121 located along X-direction edges 119, each X-direction end 129 adjoins an end 129 of an adjacent primary lenslet 121 in the same column.

Lens surface 115 also has a plurality of secondary lenslets 131 which form part of the border region 125 of the primary lenslets 121. Like primary lenslets 121, secondary lenslets 131 are formed in lens surface 115, but at a second elevation (not shown) in the substrate. First elevation 123 is deeper than the second elevation. Also, each secondary lenslet 131 has a lesser surface area than each primary lenslet 121. Secondary lenslets 131 are generally positive spherical or aspheric lenses. Secondary lenslets 131 curve in both the X-direction and Y-direction. Each secondary lenslet 131 has a polygonal border or peripheral region 135. In the preferred embodiment, periphery 135 is generally in the shape of an isosceles triangle with a base 137 and sides 139. Other than the secondary lenslets 131 located along X-direction edges 119, each base 137 is near a base 137 of an adjacent secondary lenslet 131. Each pair of adjacent secondary lenslets 131 extends partially between adjoining columns and rows of primary lenslets 121 so that peripheries 135 coincide with peripheries 125 along sides 139.

Microlens array 111 further comprises a symmetrical array of tertiary lenslets 141 which are selectively formed between primary lenslets 121 and secondary lenslets 131 into X-direction rows. Tertiary lenslets 141 are optional and could be located at various positions. Tertiary lenslets 141 share a periphery 125 with primary lenslets 121 as well as with secondary lenslets 131. Each tertiary lenslet 141 extends into lens surface 115 for a third elevation (not shown). The second elevation is deeper than the third elevation. Also, each tertiary lenslet 141 has a lesser surface area than each secondary lenslet 131. Tertiary lenslets 141 have peripheries 145 which are hexagonal or six-sided in shape. Peripheries 145 have X-direction sides 147 and ends 149. Other than the tertiary lenslets 141 on edges 119, each side 147 coincides with a base 137 of a secondary lenslet 131. Each end 149 abuts another end 149.

In operation, microlens arrays 11, 111 are utilized to provide desired illumination output patterns. One of microlens arrays 11, 111 is positioned between a light source (not shown) and a projection surface (not shown). When light from the light source is directed through microlens array 11 or 111 constructed as described above, a rectangular resultant beam pattern will be displayed on the projection surface.

The invention has several advantages. Microlens arrays constructed with lenslets having multiple shapes at varying depths and/or elevations are adaptable to provide a variety of resultant beam pattern shapes. The improved microlens array also produces output beams with a higher intensity than those produced by etched or blasted surfaces.

While the invention has been shown in only some of its forms, it should be apparent to those skilled in the art that it is not so limited, but is susceptible to various changes without departing from the scope of the invention.

I claim:

1. A microlens array for illumination, comprising:

a plurality of primary lenslets on a substrate, the primary lenslets having curved cross-sectional shapes, each of the primary lenslets having a surface area, a peripheral region and a first vertical dimension;

a plurality of secondary lenslets at the peripheral regions of the primary lenslets, the secondary lenslets each having a peripheral region that is generally triangular in shape, a surface area smaller than the surface areas of the primary lenslets and a second and lesser vertical dimension; and a plurality of tertiary lenslets at the peripheral regions of adjacent ones of the secondary lenslets, the tertiary lenslets being formed at a third vertical dimension in the peripheral regions of the secondary lenslets, the third vertical dimension being smaller than the second vertical dimension.

2. An improved microlens array for illumination, comprising:

a substrate;

a substantially symmetrical array of primary lenslets on one side of the substrate, the primary lenslets having curved cross-sectional shapes and having a first vertical dimension, each of the primary lenslets further having a generally polygonal peripheral region adjacent ones of the primary lenslets;

a substantially symmetrical array of secondary lenslets located at the peripheral regions between the primary lenslets, the secondary lenslets having curved cross-sectional shapes and a second vertical dimension which is different from the first vertical dimension;

each of the secondary lenslets having a peripheral region which adjoins an adjacent one of the secondary lenslets; and a generally symmetrical array of tertiary lenslets at the peripheral regions between adjoining ones of the secondary lenslets.

3. An improved microlens array for illumination, comprising:

a substrate;

a generally symmetrical array of X-direction rows and Y-direction columns of generally polygonal, primary lenslets on one side of the substrate, each primary lenslet having a first vertical dimension in X-direction and Y-direction cross-sections;

a pair of secondary lenslets extending between each of the primary lenslets in each of the rows, each of the secondary lenslets having a second and lesser vertical dimension in X-direction and Y-direction cross-sections than the first vertical dimension, each of the secondary lenslets having a generally triangular peripheral region; and a plurality of polygonal, tertiary lenslets, each dividing the adjacent bases of the secondary lenslets and extending generally parallel to each of the rows, each of the tertiary lenslets having a convex profile which is at a third elevation in the substrate which is less than the second elevation.

4. A microlens array for illumination comprising:

a plurality of primary lenslets arranged into a symmetrical array of Y-direction columns on a substrate, each of said primary lenslets having a first surface area and a peripheral region that is decagonal in shape, the primary lenslets further forming a first vertical dimension with respect to the substrate;

a plurality of secondary lenslets on the substrate formed in the peripheral region of the primary lenslets, each of the secondary lenslets having a peripheral region that is triangular in shape, a second surface area that is smaller than the first surface area, and forming a second vertical dimension with respect to the substrate which is smaller than the first vertical dimension; and a plurality of tertiary lenslets on the substrate formed at the peripheral regions of adjacent ones of the secondary lenslets, the tertiary lenslets forming a third vertical dimension with respect to the substrate which is smaller than the second vertical dimension.

5. The microlens array of claim 4 wherein the primary and secondary lenslets provide a generally convex cross-sectional profile.

6. The microlens array of claim 4 wherein the primary and secondary lenslets provide a generally concave cross-sectional profile.

7. The microlens array of claim 4 wherein the array has a periphery that is rectangular in shape.

8. A microlens array for illumination, comprising:

a plurality of primary lenslets on a substrate, the primary lenslets having curved cross-sectional shapes and a generally convex cross-sectional profile, each of the primary lenslets having a first surface area, and a peripheral region;

a plurality of secondary lenslets on the substrate at the peripheral regions of the primary lenslets, the secondary lenslets each having a generally convex cross-sectional profile, a peripheral region, and a second surface area; and a plurality of tertiary lenslets on the substrate.

* * * * *